(12) United States Patent
Huang et al.

(10) Patent No.: US 8,769,287 B2
(45) Date of Patent: Jul. 1, 2014

(54) METHOD, SYSTEM, AND DEVICE FOR OBTAINING KEYS

(75) Inventors: Min Huang, Chengdu (CN); Lifeng Liu, Chengdu (CN); Shi Wan, Chengdu (CN)

(73) Assignee: Chengdu Huawei Symantec Technologies Co., Ltd., Chengdu (CN)

( * ) Notice: Subject to any disclaimer, the term of this patent is extended or adjusted under 35 U.S.C. 154(b) by 189 days.

(21) Appl. No.: 12/871,646

(22) Filed: Aug. 30, 2010

(65) Prior Publication Data
US 2010/0325436 A1    Dec. 23, 2010

Related U.S. Application Data

(63) Continuation of application No. PCT/CN2009/071371, filed on Apr. 20, 2009.

(30) Foreign Application Priority Data

Apr. 21, 2008    (CN) .......................... 2008 1 0093122

(51) Int. Cl.
*H04L 9/32*    (2006.01)
*G06F 21/00*    (2013.01)

(52) U.S. Cl.
USPC .......................................... 713/171; 713/182

(58) Field of Classification Search
None
See application file for complete search history.

(56) References Cited

U.S. PATENT DOCUMENTS

| | | | |
|---|---|---|---|
| 6,886,096 B2 | 4/2005 | Appenzeller et al. | |
| 7,860,247 B2 * | 12/2010 | McCullagh et al. | 380/44 |
| 2004/0179684 A1 | 9/2004 | Appenzeller et al. | |
| 2004/0236965 A1 * | 11/2004 | Krohn | 713/201 |
| 2008/0044032 A1 * | 2/2008 | Lou et al. | 380/284 |
| 2008/0052521 A1 * | 2/2008 | Gentry et al. | 713/180 |
| 2008/0065729 A1 * | 3/2008 | Haas | 709/206 |
| 2008/0267394 A1 | 10/2008 | Nan et al. | |

FOREIGN PATENT DOCUMENTS

CN    1633071 A    6/2005

OTHER PUBLICATIONS

Lim, Hoon Wei & Paterson, Kenneth G., "Identity-Based Cryptography for Grid Security," 2005, IEEE, pp. 1-10.*
Huang, M. "Identity-Based Encryption (IBE) Cipher Suites for Transport Layer Security (TLS) draft-huang-tls-ibe-00." IETF Trust. Jul. 3, 2009.
International Search Report issued in corresponding PCT Application No. PCT/CN2009/071371;mailed Jul. 16, 2009.
Office Action issued in corresponding Chinese Patent Application No. 200810093122.4, mailed Jul. 19, 2011.

(Continued)

*Primary Examiner* — Azizul Choudhury
(74) *Attorney, Agent, or Firm* — Brinks Gilson & Lione

(57) ABSTRACT

A communication system that obtains a key includes: a server that confirms support of Identity Based Encryption (IBE) authentication; the server obtains public parameters and a private key for IBE; and the server receives a PreMasterSecret key encrypted through the IBE, and obtains a plain text of the PreMasterSecret key according to the public parameters and the private key. The system includes a client and a server. The client includes an IBE negotiating module, a public parameter obtaining module, a server identifier obtaining module, and a processing module. The server includes an IBE negotiating module, a public parameter obtaining module, a private key obtaining module, and a processing module. Through combination of the IBE technology and the SSL/TLS technology, the modes of encrypting a PreMasterSecret key in the existing SSL/TLS protocol are diversified, and the use scope of the existing SSL/TLS protocol is extended substantially.

13 Claims, 4 Drawing Sheets

(56) References Cited

OTHER PUBLICATIONS

Written Opinion of the International Searching Authority issued in corresponding PCT Patent Application No. PCT/CN2009/071371, mailed Jul. 16, 2009.
Office Action issued in corresponding Chinese Patent Application No. 200810093122.4, mailed Dec. 1, 2010.
Extended European Search Report issued in corresponding European Patent Application No. 09735103.5, mailed Dec. 20, 2011.
Office Action issued in corresponding European Patent Application No. 09735103.5, mailed Sep. 21, 2012.
Office Action issued in corresponding Chinese Patent Application No. 200810093122.4, mailed Apr. 11, 2012.
Lim et al., "Indentity-Based Cryptography for Grid Security" Proceedings of the First International Conference on e-Science and Grid Computing, IEEE 2005.
Kent et al., "Security Architecture for the Internet Protocol" Network Working Group, Nov. 1998.
Hajjeh et al., "ISAKMP Handshake for SSL/TLS" GLOBECOM IEEE 2003.
Office Action issued in corresponding Chinese Patent Application No. 200810093122.4, mailed Nov. 5, 2012.

* cited by examiner

METHOD, SYSTEM, AND DEVICE FOR OBTAINING KEYS

CROSS-REFERENCE TO RELATED APPLICATIONS

This application is a continuation of International Application No. PCT/CN2009/071371, filed on Apr. 20, 2009, which claims priority to Chinese Patent Application No. 200810093122.4, filed on Apr. 21, 2008, both of which are hereby incorporated by reference in their entireties.

FIELD

The present application relates to the communications field, and in particular, to a method, a system, and a device for obtaining keys.

BACKGROUND

With the rapid popularization of the Internet, web-based applications are flourishing, and remote access is increasing massively. As a result, the security problems are noticeable. Netscape puts forward a Secure Socket Layer (SSL) protocol to solve the security problems that occur while the browser accesses the Internet resources. Later, the Internet Engineering Task Force (IETF) standardizes the protocol, and renames the protocol as Transport Layer Security Protocol (TLS).

The Virtual Private Network (VPN) based on the SSL/TLS technology uses the SSL/TLS to ensure security and reliability of the user's remote access network, and make the data transmission in the remote access network as secure as that in a private network. In the past, the SSL/TLS VPN device provides only assurance for web access security. But now, it supports security assurance for various applications, and becomes one of the indispensable security products.

Both parties involved in the SSL/TLS communication use the same key to export functions, and use the same PreMasterSecret key and the random number as parameters to calculate out all keys in the communication process. Because the random number is transmitted in the form of plain texts, the security of the PreMasterSecret key is most essential in the SSL/TLS communication process.

In the process of development, the applicant finds that the PreMasterSecret key in the existing SSL/TLS handshake protocol is generated and sent by the client in both parties involved in the SSL/TLS communication according to the private key of the server. The form of generating PreMasterSecret key is unitary, which restricts the use scope of the SSL/TLS protocol and hinders the development of the SSL/TLS protocol.

SUMMARY

The embodiments below provide a method, a system, and a device for obtaining a key to accomplish secure communication handshake between both communication parties and reduce the overhead of certificate management and maintenance. The technical solution is as follows:

A method for obtaining a key includes:
by a server, confirming support of Identity Based Encryption (IBE) authentication;
obtaining public parameters and a private key for IBE; and
receiving a PreMasterSecret key encrypted through IBE, and obtaining a plain text of the PreMasterSecret key according to the public parameters and the private key.

A system for obtaining a key includes:
a client, adapted to: obtain public parameters for IBE after negotiating with a server about IBE authentication, and use an obtained server identifier and the obtained public parameters to generate and send a PreMasterSecret key encrypted through IBE; and
a server, adapted to: obtain the public parameters for the IBE after negotiating with the client about IBE authentication, receive the PreMasterSecret key encrypted through IBE from the client, use the obtained public parameters and an obtained private key to decrypt the PreMasterSecret key encrypted through IBE, and obtain a plain text of the PreMasterSecret key.

A client provided in an embodiment includes:
an IBE negotiating module, adapted to negotiate with a server about IBE authentication;
a public parameter obtaining module, adapted to obtain public parameters for IBE; and
a server identifier obtaining module, adapted to obtain a server identifier; and
a processing module, adapted to generate and send a PreMasterSecret key encrypted through IBE according to the server identifier obtained by the server identifier obtaining module and the public parameters obtained by the public parameter obtaining module.

A server provided in an embodiment includes:
an IBE negotiating module, adapted to negotiate with a client about IBE authentication;
a public parameter obtaining module, adapted to obtain public parameters for IBE;
a private key obtaining module, adapted to obtain a private key for decrypting a PreMasterSecret key encrypted through IBE; and
a processing module, adapted to: receive the PreMasterSecret key encrypted through IBE from the client, use the private key obtained by the private key obtaining module and the public parameters obtained by the public parameter obtaining module to decrypt the PreMasterSecret key encrypted through IBE, and obtain a plain text of the PreMasterSecret key.

A providing device is provided in an embodiment. The providing device is adapted to provide public parameters for IBE in the IBE SSL/TLS protocol-based authentication negotiation between a server and a client. The public parameters are used by the client to generate a PreMasterSecret key encrypted through IBE according to the public parameters and the server identifier. Accordingly, the server obtains a plain text of the PreMasterSecret key encrypted through IBE according to the public parameters and the obtained private key.

The technical solution described brings the following benefits:

The SSL/TLS server supports the IBE SSL/TLS handshake negotiation, uses the obtained public parameters and private key congruent with IBE to decrypt the PreMasterSecret key encrypted through IBE, and obtains the plain text of the PreMasterSecret key. Therefore, the IBE technology is combined with the SSL/TLS technology to accomplish secure communication handshake between communication parties, thus simplifying the certificate management, and saving the cost of constructing and managing Certification Authority on the network application layer and the overhead of maintaining a series of digital certificates. Moreover, the use scope of the existing SSL/TLS protocol is extended, and the modes of encrypting the PreMasterSecret key in the existing SSL/TLS protocol are diversified.

DETAILED DESCRIPTION

To make the technical solution, and merits of the claims clearer, the following describes the various embodiments in detail with reference to the accompanying drawings.

The IBE technology was initially put forward by Shamir in 1984 with the original intention of simplifying the certificate management in the email system, accomplishing secure communication between two users, and verifying the signature of everyone without exchanging the private key or public key. The IBE authentication system is an encryption mode that uses the public identifier of the user as a public key, and involves no need of binding the identity to the public key of the user through certificates. The public identifier may be any disclosed string information that can represent the user identity, for example, email address, IP address, identity card number or mobile phone number of the user. The peer's private key for decryption is distributed by a Private Key Generator (PKG) preset in the IBE authentication system.

Compared with the traditional solution that is based on the Public Key Infrastructure (PKI), the IBE cancels the CA, namely, a third-party authentication organization, and therefore, the IBE saves the cost of constructing and managing the CA on the application plane and the work of generating, updating and canceling the digital certificates; overcomes the difficulties on the technical plane, for example, start point of trust and transmission of trust in the cross-authentication, and CA overload caused by increase of users, and thus saving bandwidth resources and reducing the required storage space.

The key obtaining method provided herein exerts the merits of the IBE technology. In an example which combines the IBE technology with the SSL/TLS technology, the contents of the method are as follows:

The client negotiates with the server in the SSL/TLS VPN system with respect to IBE authentication, namely, the server confirms support of the IBE authentication.

The server obtains the public parameters (which may be obtained through negotiation with the client) and the private key for IBE.

The server receives a PreMasterSecret key encrypted through IBE (the key is sent by the client after the client uses the obtained server identifier and public parameters to generate a PreMasterSecret key encrypted through IBE).

The server obtains the plain text of the PreMasterSecret key according to the obtained public parameters and private key.

In this way, secure communication handshake is implemented between both communication parties, the modes of encrypting the PreMasterSecret key in the existing SSL/TLS protocol are diversified, and the use scope of the existing SSL/TLS protocol is extended massively.

Embodiment 1

Figure 1:
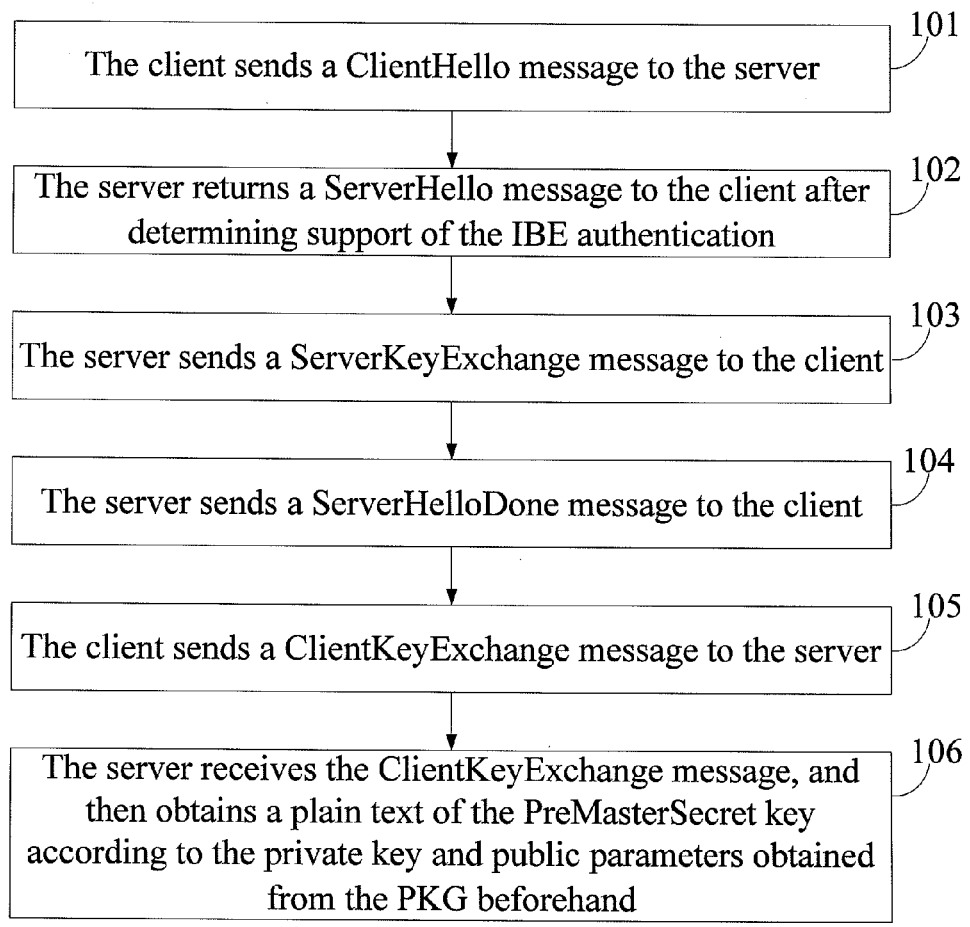
FIG. 1 is a flowchart of a method for obtaining a key in the first embodiment.

FIG. 1 shows a method for obtaining a key in this embodiment. To keep consistent with the standard SSL/TLS protocol, the SSL/TLS uses the IBE to perform handshake, and the handshake process includes the following steps:

Step 101: The client sends a client handshake request message "ClientHello" to the server. The ClientHello message carries a key package which uses IBE for authentication.

When the client sends a client handshake request message "ClientHello" to the server, the message needs to carry not only the contents stipulated in the SSL/TLS standard, but also a key package list which uses IBE for authentication. The key packet list includes an IBE algorithm, an authentication algorithm, an encryption algorithm, and a summary algorithm. The key package list is designed to negotiate with the server about using the IBE for authentication. In practice, the client handshake request message "ClientHello" sent by the client to the server may carry the key package which uses other methods for authentication.

Step 102: The server receives the client handshake request message "ClientHello" from the client, determines that the server supports the IBE for authentication, and returns a server handshake request message "ServerHello" in response to the client handshake request message "ClientHello".

The server handshake request message "ServerHello" (or known as "server handshake message") returned by the server indicates that the server agrees to use the IBE for authentication. For example, if the client sends multiple key packages for authentication that include the IBE key package in step 101, the ServerHello message may carry the key package selected by the server for IBE authentication. This embodiment does not restrict the style of the server handshake message "ServerHello". If the server determines that the server itself does not support the IBE for authentication, the server needs to return a response message to the client, indicating inability of using the IBE for authentication.

Step 103: After the server agrees to use the IBE for authentication, the server sends a ServerKeyExchange message to the client. According to the message, the server negotiates with the client about the public parameters required for IBE authentication.

With respect to the public parameters involved in step 103, those skilled in the art know that in the IBE authentication, the specific functions such as random number need to be used to generate a PreMasterSecret key, use the public parameters and the peer device identifier to encrypt the generated PreMasterSecret key, and send the encrypted PreMasterSecret key to the peer device. The public parameters for IBE encryption are generally a package of data that includes a series of parameters, for example, a security curve and an algorithm set according to the system requirements.

Step 104: The server sends a ServerHelloDone message to the client, indicating that the server has finished the preparatory work for authentication.

The ServerHelloDone message sent by the server may be a standard SSL/TLS handshake message.

Step 105: The client sends a ClientKeyExchange message to the server. The message includes two parts:

information about negotiation of public parameters of the IBE, serving as a response to the ServerKeyExchange message sent in step 103; and a PreMasterSecret key sent to the server, which is encrypted through IBE according to the public parameters obtained after negotiation and the pre-obtained server identifier.

Step 106: After the server receives the ClientKeyExchange from the client, the server uses the private key and public parameters obtained from the PKG to decrypt the PreMaster- Secret key encrypted through IBE according to the PreMasterSecret key carried in the message, and obtains the plain text of the PreMasterSecret key.

Figure 2:
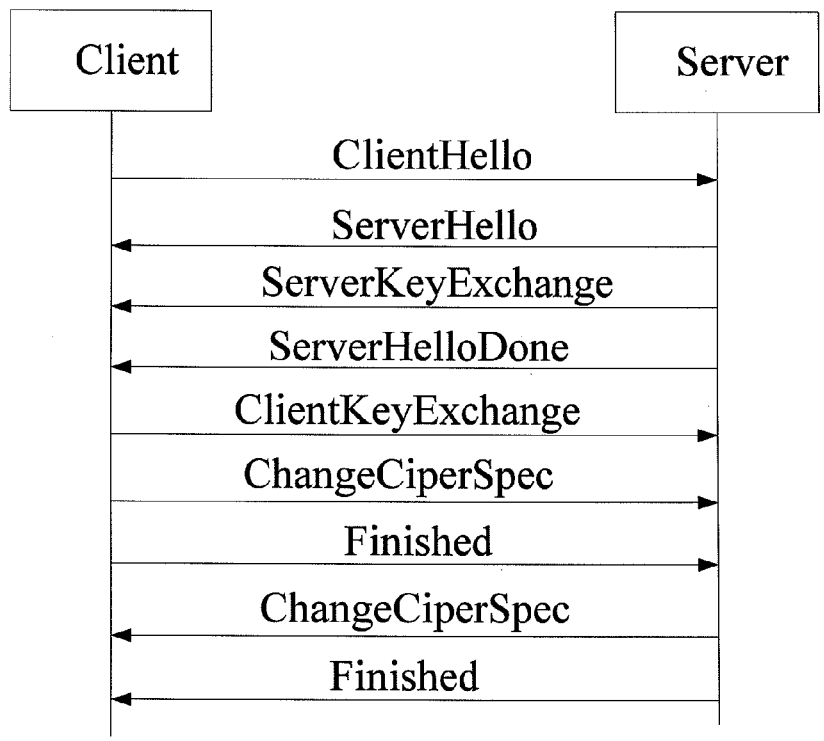
FIG. 2 shows information interaction for obtaining a key in the first embodiment.

FIG. 2 shows how the SSL/TLS uses IBE for handshake in the method for obtaining a key in an embodiment. The detailed interaction process is described above, and is not repeated here any further.

In conclusion, through a ClientHello message and a ServerHello message, the client and the server confirm that the authentication is performed through IBE; through a ServerKeyExchange message and a ClientKeyExchange message, the client and the server finishes negotiation about the public parameters. In practice, there are several negotiation modes, which are described below:

(i) If the client and the server pre-share a unique package of public parameters and the server interacts with the client through no message that includes the public parameters, it indicates that the client and the server use the pre-shared public parameters by default.

In practice, the server does not need to send a ServerKeyExchange message in step 103, but uses a ServerHelloDone message to indicate completion of the server handshake message. By this means, the server indicates that the pre-shared public parameters are used by default. Accordingly, in step 105, the ClientKeyExchange message sent by the client does not need to carry information about the public parameters (the client confirms use of the default pre-shared public parameters), but needs to carry only one item, namely, the PreMasterSecret key encrypted through the pre-shared public parameters and the server identifier to the server.

(ii) If the client and the server pre-share a unique package of public parameters, the server sends a ServerKeyExchange message to the client, instructing the client to use the pre-shared public parameters. The client responds with a ClientKeyExchange message.

In practice, the server may add a preset identifier into the ServerKeyExchange message sent in step 103. The preset identifier notifies the client to use the pre-shared public parameters, without carrying any substantial content related to the public parameters. Accordingly, in step 105, the client confirms use of the pre-shared parameters, and transmits the preset identifier through a ClientKeyExchange message, and this preset identifier confirms use of the pre-shared public parameters, without carrying any substantial content related to the public parameters.

The unique package of public parameters is obtained by the client and the server from the PKG separately, and then stored.

(iii) If the client and the server pre-share more than one package of public parameters, the server sends a ServerKeyExchange message to the client, indicating the identifier corresponding to the proposed public parameters. The client responds with a ClientKeyExchange message.

In practice, the server in step 103 selects at least one package of public parameters among the shared packages of public parameters according to the specific system deployment policy. Each package of public parameters may correspond to a unique identifier. Table 1 shows the mapping relationship between the public parameter and the identifier. The ServerKeyExchange message carries the identifier corresponding to the selected public parameters to the client.

TABLE 1

| Identifier | Public parameter |
| --- | --- |
| 1 | First package of public parameters |
| 2 | Second package of public parameters |
| 3 | Third package of public parameters |

Accordingly, because more than one package of public parameters is shared by the client and the server, the identifier that represents each package of public parameters is unique. In step 104, the client obtains a package of public parameters according to the identifier provided by the server, and then responds to the server with a ClientKeyExchange message that carries the identifier corresponding to the package of public parameters.

Further, if the server sends more than one public parameter identifier to the client, the client selects one identifier among the identifiers provided by the server according to its own selection policy. The client uses the public parameters corresponding to the selected identifier.

Alternatively, after the client receives the public parameter identifier sent by the server, the client does not select the public parameters corresponding to the public parameter identifier sent by the server, but selects a package of public parameters in use, depending on the selection policy of the client. The client responds to the server with a ClientKeyExchange message that carries the identifier corresponding to the selected package of public parameters.

The packages of public parameters above are obtained by the client and the server from the PKG separately, and then stored.

(iv) If the client and the server do not pre-share the public parameters, the server sends a ServerKeyExchange message that carries a package of public parameters for encryption to the client; or the server sends a ServerKeyExchange message that carries more than one package of public parameters to the client, and the client selects a package of public parameters among the received packages of public parameters, and responds to the server with a ClientKeyExchange message which indicates the selected package of public parameters.

In practice, the server may send a ServerKeyExchange message that carries the public parameters and the corresponding identifier; and the client may respond to the server with a ClientKeyExchange message that carries only the identifier.

(v) If the public parameters are obtained remotely, the server sends a ServerKeyExchange message to the client, where the message carries the identifier for locating the public parameters and the identifier may be an address (or domain name) of the PKG that generates the public parameters. Accordingly, after receiving the ServerKeyExchange message, the client obtains the public parameters from the PKG according to the identifier carried in the message, and sends a ClientKeyExchange message to the server, indicating the selected public parameters.

Figure 3:
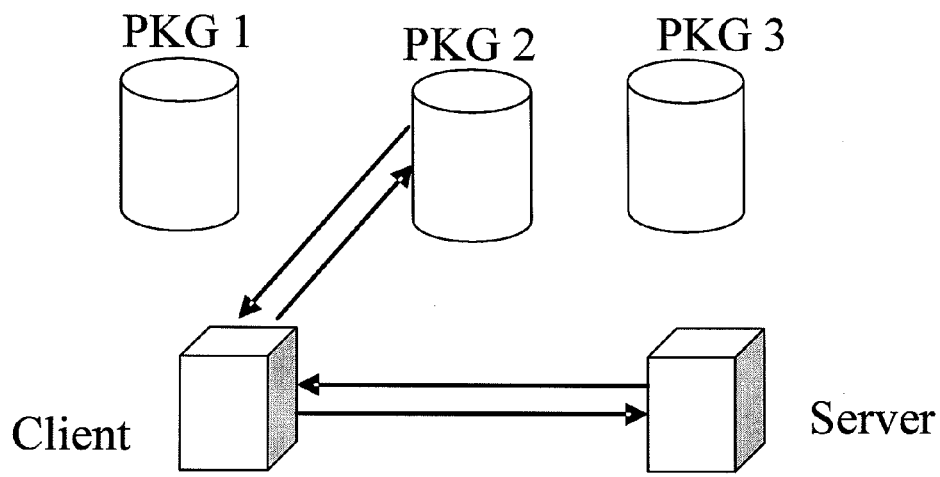
FIG. 3 shows a communication scenario for obtaining a key in the first embodiment.

Further, when the server sends a ServerKeyExchange message that carries the identifier for locating the public parameters, the message may carry identifiers of more than one PKG. Accordingly, the client selects one PKG identifier among the identifiers according to its own policy (for example, from the perspective of security and convenience) and obtains the public parameters from the PKG. FIG. 3 shows a communication scenario in this scenario, where the server sends address identifiers of PKG1, PKG2, and PKG3 to the client, and the client selects PKG2 according to its own policy and obtains the public parameters from the PKG2.

(vi) If the public parameters are obtained remotely and a public parameter server is preset for storing multiple packages of public parameters (as a function entity, the public parameter server may exist independently or is integrated in the existing PKG device), the server sends a ServerKeyExchange message that carries the address for storing the public parameters in the public parameter server to the client. Table 2 shows the mapping relationship between the public parameter and the address. Accordingly, after receiving the ServerKeyExchange message, the client obtains the public parameters from the public parameter server according to the address information carried in the message, and responds to the server with a ClientKeyExchange message, indicating the address of storing the selected public parameters.

TABLE 2

| Public parameter | Address |
| --- | --- |
| First package of public parameters | A |
| Second package of public parameters | B |
| Third package of public parameters | C |

Further, when the server sends a ServerKeyExchange message that carries the address to the client, the message may carry more than one address. The client selects one of the addresses according to its own policy and obtains the public parameters from the selected address.

Further, as shown in Table 3, an identifier may be set for the public parameters and the address. Accordingly, the server sends a ServerKeyExchange message that carries the identifier of the public parameters to the client. The client obtains the public parameters from the address corresponding to the received identifier, and responds to the server with a ClientKeyExchange message that carries the identifier of the selected public parameters.

TABLE 3

| Identifier | Public parameter | Address |
| --- | --- | --- |
| 1 | First package of public parameters | A |
| 2 | Second package of public parameters | B |
| 3 | Third package of public parameters | C |

In conclusion, in the fifth mode and the sixth mode above, the client needs to obtain public parameters from the third party (PKG or public parameter server). Therefore, the client selects a trusted third party for obtaining the public parameters among the options provided by the server according to its own security policy, thus preventing intermediary attacks. The client needs to maintain a list of trusted third parties.

Figure 4:
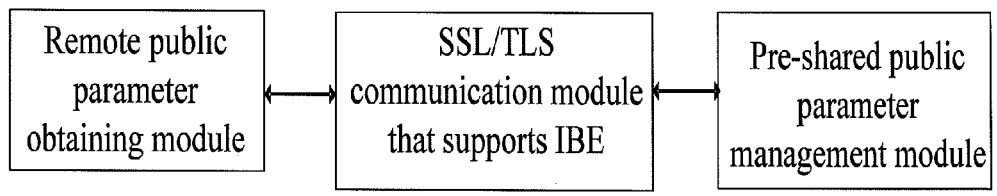
FIG. 4 shows an SSL/TLS VPN device for obtaining a key in the first embodiment.

Those skilled in the art know that the SSL/TLS VPN typically plays the role of a server in the SSL/TLS communication process, and may also be a client (for example, in the case that the SSL/TLS VPN sets up a site-to-site tunnel). As shown in FIG. 4, the SSL/TLS VPN needs to have the following function modules so that it can support the IBE. The IBE-supported SSL/TLS communication module implements the SSL/TLS handshake. In the handshake process, when the IBE needs to obtain the public parameters for encryption and decryption, if the negotiation mode (i), (ii) or (iii) above is applied, the pre-shared public parameter managing module is invoked to obtain the public parameters from the local directory; if the negotiation mode (iv), (v) or (vi) above is applied, the remote public parameter obtaining module is invoked to obtain the public parameters.

In conclusion, the method for obtaining a key in this embodiment combines the IBE technology with the SSL/TLS technology, enriches the modes of encrypting the PreMasterSecret key in the existing SSL/TLS protocol, and extends the use scope of the existing SSL/TLS protocol. Moreover, the SSL/TLS client negotiates with the server in any one of the foregoing six modes to uniquely determine the public parameters used in the encryption operation and decryption operation, and implement secure transmission of the PreMasterSecret key.

Embodiment 2

Figure 5:
FIG. 5 shows a system for obtaining a key in the second embodiment.

As shown in FIG. 5, a system for obtaining a key is provided in this embodiment. The system includes:
a client 201, adapted to: obtain public parameters for IBE after negotiating with a server 202 about IBE authentication (the public parameters may be obtained through negotiation with the server 202), and use an obtained server identifier and the obtained public parameters to generate and send a PreMasterSecret key encrypted through IBE; and
a server 202, adapted to: obtain public parameters for IBE after negotiating with the client 201 about IBE authentication (the public parameters may be obtained through negotiation with the client 201), receive the PreMasterSecret key encrypted through IBE from the client 201, and use an obtained private key to decrypt the PreMasterSecret key and obtain the plain text of the PreMasterSecret key.

The client 201 in the system for obtaining a key in this embodiment includes:
an IBE negotiating module, adapted to: send a client request message to the server 202, where the client request message carries a key package for IBE authentication; and receive the IBE acknowledgement message returned by the server 202;
a public parameter obtaining module, adapted to obtain public parameters for IBE;
a server identifier obtaining module, adapted to obtain a server identifier; and
a processing module, adapted to generate and send a PreMasterSecret key encrypted through IBE according to the public parameters obtained by the public parameter obtaining module and the server identifier obtained by the server identifier obtaining module.

The public parameter obtaining module of the client 201 includes:
(a) a public parameter storing unit, adapted to store a package of public parameters, and a public parameter selecting unit, adapted to obtain the public parameters stored in the public parameter storing unit, in the case that a pre-shared package of public parameters is used by default after the client 201 and the server 202 perform IBE authentication negotiation; or
(b) a public parameter storing unit, adapted to store at least one package of public parameters; a public parameter selecting unit, adapted to select a package of public parameters in the public parameter storing unit as notified by the server 202; and a responding unit, adapted to respond to the server 202 with the selected public parameters after the public parameter selecting unit selects a package of public parameters; or (c) a public parameter obtaining unit, adapted to obtain at least one package of public parameters sent by the server 202; a public parameter selecting unit, adapted to select a package of public parameters among the public parameters obtained by the public parameter obtaining unit; and a responding unit, adapted to notify the server 202 of the selected public parameters after the public parameter selecting unit selects a package of public parameters; or (d) a PKG identifier obtaining unit, adapted to obtain at least one PKG identifier sent by the server 202; a PKG identifier selecting unit, adapted to select a PKG identifier among the PKG identifiers obtained by the PKG identifier obtaining unit; a public parameter obtaining unit, adapted to obtain public parameters from the PKG corresponding to the PKG identifier selected by the PKG identifier selecting unit; and a notifying unit, adapted to notify the server 202 of the selected PKG identifier after the PKG identifier selecting unit selects the PKG identifier, in the case that the system further includes at least one PKG for providing public parameters; or (e) an address identifier obtaining unit, adapted to obtain at least one public parameter address identifier sent by the server 202 and stored in the public parameter server; an address identifier selecting unit, adapted to select an address identifier among the address identifiers obtained by the address identifier obtaining unit; a public parameter obtaining unit, adapted to obtain public parameters from the public parameter server according to the address identifier selected by the address identifier selecting unit; and a notifying unit, adapted to notify the server 202 of the selected address identifier after the address identifier selecting unit selects the address identifier, in the case that the system further includes a public parameter server capable of providing at least one package of public parameters.

The server 202 in the system for obtaining a key in this embodiment includes:

an IBE negotiating module, adapted to: receive a client request message sent by the client 201, where the client request message carries a key package for IBE authentication; and return an acknowledgement message to the client 201 after determining support of IBE authentication;

a public parameter obtaining module, adapted to negotiate with the client 201 about the public parameters for IBE;

a private key obtaining module, adapted to obtain a private key for decrypting the PreMasterSecret key encrypted through IBE; and a processing module, adapted to: receive the PreMasterSecret key encrypted through IBE from the client 201, decrypt the PreMasterSecret key by using the private key obtained by the private key obtaining module, and obtain the plain text of the PreMasterSecret key.

The public parameter obtaining module of the server 202 includes:

(a) a public parameter storing unit, adapted to store a package of public parameters, and a public parameter selecting unit, adapted to obtain the public parameters stored in the public parameter storing unit, in the case that a pre-shared package of public parameters is used by default after the client 201 and the server 202 perform IBE authentication negotiation; or (b) a public parameter storing unit, adapted to store at least one package of public parameters; a notifying unit, adapted to send a notification to the client 201 according to the public parameters stored in the public parameter storing unit; and a receiving unit, adapted to receive the response about the selected public parameters from the client 201; or (c) a sending unit, adapted to send at least one package of public parameters to the client 201; and a receiving unit, adapted to receive the response about the selected public parameters from the client 201; or (d) a PKG identifier sending unit, adapted to send at least one PKG identifier to the client 201, a receiving unit, adapted to receive the selected PKG identifier returned by the client 201, and an obtaining unit, adapted to obtain a package of IBE public parameters according to the PKG identifier received by the receiving unit, in the case that system further includes at least one PKG for providing public parameters; or (e) an address identifier sending unit, adapted to send at least one public parameter address identifier stored in the public parameter server to the client 201, a receiving unit, adapted to receive the selected address identifier returned by the client 201, and an obtaining unit, adapted to obtain a package of public parameters for IBE according to the address identifier received by the receiving unit, in the case that the system further includes a public parameter server capable of providing at least one package of public parameters.

In conclusion, the system for obtaining a key in this embodiment combines the IBE technology with the SSL/TLS technology, enriches the modes of encrypting the PreMasterSecret key in the existing SSL/TLS protocol, and extends the use scope of the existing SSL/TLS protocol. Moreover, the SSL/TLS client negotiates public parameters with the server in any one of the multiple modes to uniquely determine the public parameters used in the encryption operation and decryption operation, and implement secure transmission of the PreMasterSecret key.

Embodiment 3

Figure 6:
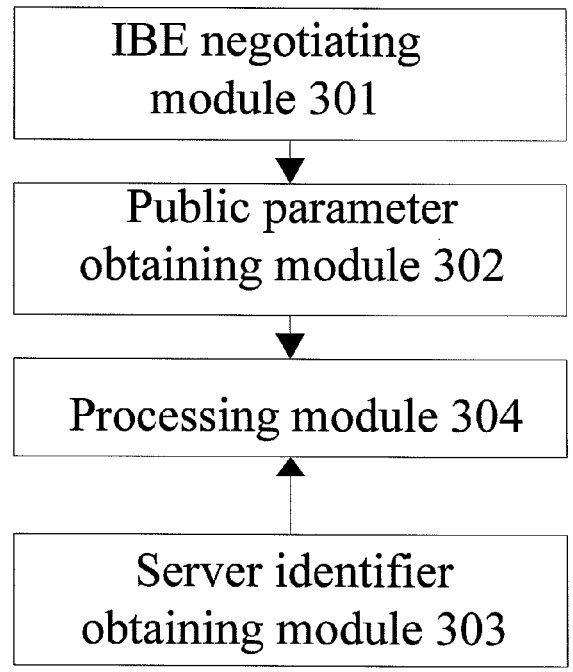
FIG. 6 shows a client provided in the third embodiment.

As shown in FIG. 6, a client is provided in this embodiment. The client includes:

an IBE negotiating module 301, adapted to negotiate with a server about IBE authentication;

a public parameter obtaining module 302, adapted to obtain the public parameters for IBE (specifically, through negotiation with the server);

a server identifier obtaining module 303, adapted to obtain a server identifier; and a processing module 304, adapted to generate and send a PreMasterSecret key encrypted through IBE according to the server identifier obtained by the server identifier obtaining module 303 and the public parameters obtained by the public parameter obtaining module 302.

Specifically, the IBE negotiating module 301 is adapted to send a client request message to the server, where the client request message carries a key package for IBE authentication, and receive the IBE acknowledgement message returned by the server.

The public parameter obtaining module 302 includes:

(a) a public parameter storing unit, adapted to store a package of public parameters, and a public parameter selecting unit, adapted to obtain the public parameters stored in the public parameter storing unit, in the case that a pre-shared package of public parameters is used by default after the client and the server perform IBE authentication negotiation; or (b) a public parameter storing unit, adapted to store at least one package of public parameters; a public parameter selecting unit, adapted to select a package of public parameters in the public parameter storing unit as notified by the server; and a responding unit, adapted to respond to the server with the selected public parameters after the public parameter selecting unit selects a package of public parameters; or (c) a public parameter obtaining unit, adapted to obtain at least one package of public parameters sent by the server; a public parameter selecting unit, adapted to select a package of public parameters among the public parameters obtained by the public parameter obtaining unit; and a responding unit, adapted to notify the server of the selected public parameters after the public parameter selecting unit selects a package of public parameters; or (d) a PKG identifier obtaining unit, adapted to: obtain at least one PKG identifier sent by the server; a PKG identifier selecting unit, adapted to select a PKG identifier among the PKG identifiers obtained by the PKG identifier obtaining unit; a public parameter obtaining unit, adapted to obtain public parameters from the PKG corresponding to the PKG identifier selected by the PKG identifier selecting unit; and a notifying unit, adapted to notify the server of the selected PKG identifier after the PKG identifier selecting unit selects the PKG identifier; or (e) an address identifier obtaining unit, adapted to obtain at least one public parameter address identifier sent by the server and stored in the public parameter server; an address identifier selecting unit, adapted to select an address identifier among the address identifiers obtained by the address identifier obtaining unit; a public parameter obtaining unit, adapted to obtain public parameters from the public parameter server according to the address identifier selected by the address identifier selecting unit; and a notifying unit, adapted to notify the server of the selected address identifier after the address identifier selecting unit selects the address identifier.

In conclusion, the client in this embodiment combines the IBE technology with the SSL/TLS technology, enriches the modes of encrypting the PreMasterSecret key in the existing SSL/TLS protocol, and extends the use scope of the existing SSL/TLS protocol. Moreover, the SSL/TLS client negotiates public parameters with the server in any one of the multiple modes to uniquely determine the public parameters used in the encryption operation and decryption operation, and implement secure transmission of the PreMasterSecret key.

Embodiment 4

Figure 7:
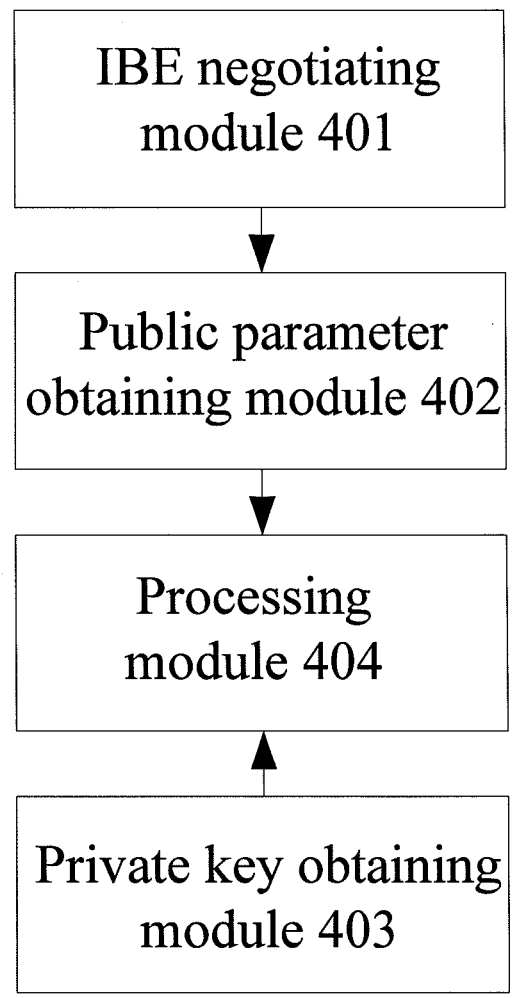
FIG. 7 shows a server provided in the fourth embodiment.

As shown in FIG. 7, a server is provided in this embodiment. The server includes:

an IBE negotiating module 401, adapted to negotiate with a client about IBE authentication;

a public parameter obtaining module 402, adapted to obtain the public parameters for IBE (specifically, through negotiation with the client);

a private key obtaining module 403, adapted to obtain a private key for decrypting the PreMasterSecret key encrypted through IBE; and a processing module 404, adapted to: receive the PreMasterSecret key encrypted through IBE from the client, use the private key obtained by the private key obtaining module 403 and the public parameters obtained by the public parameter obtaining module 402 to decrypt the PreMasterSecret key encrypted through IBE, and obtain a plain text of the PreMasterSecret key.

The IBE negotiating module 401 is adapted to: receive a client request message sent by the client, where the client request message carries a key package for IBE authentication; and return an acknowledgement message to the client after determining support of IBE authentication.

The public parameter obtaining module 402 includes:

(a) a public parameter storing unit, adapted to store a package of public parameters, and a public parameter selecting unit, adapted to obtain the public parameters stored in the public parameter storing unit, in the case that a pre-shared package of public parameters is used by default after the client and the server perform IBE authentication negotiation; or (b) a public parameter storing unit, adapted to store at least one package of public parameters; a notifying unit, adapted to send a notification to the client according to the public parameters stored in the public parameter storing unit; a receiving unit, adapted to receive the response about the selected public parameters from the client; and an obtaining unit, adapted to obtain the public parameters stored in the public parameter storing unit according to the response received by the receiving unit; or (c) a sending unit, adapted to send at least one package of public parameters to the client; a receiving unit, adapted to receive the response about the selected public parameters from the client; and an obtaining unit, adapted to obtain a package of public parameters according to the response received by the receiving unit; or (d) a PKG identifier sending unit, adapted to send at least one PKG identifier to the client; a receiving unit, adapted to receive the PKG identifier returned by the client; and an obtaining unit, adapted to obtain a package of public parameters for IBE according to the PKG identifier received by the receiving unit; or (e) an address identifier sending unit, adapted to send at least one public parameter address identifier stored in the public parameter server to the client; a receiving unit, adapted to receive the selected address identifier returned by the client; and an obtaining unit, adapted to obtain a package of public parameters for IBE according to the address identifier received by the receiving unit.

In conclusion, the server in this embodiment combines the IBE technology with the SSL/TLS technology, enriches the modes of encrypting the PreMasterSecret key in the existing SSL/TLS protocol, and extends the use scope of the existing SSL/TLS protocol. Moreover, the SSL/TLS client negotiates public parameters with the server in any one of the multiple modes to uniquely determine the public parameters used in the encryption operation and decryption operation, and implement secure transmission of the PreMasterSecret key.

Embodiment 5

A providing device is provided in this embodiment. The providing device is adapted to provide public parameters for IBE in the IBE SSL/TLS protocol-based authentication negotiation between a server and a client (specifically, according to the result of negotiation between the server and the client). The public parameters are used by the client to generate a PreMasterSecret key encrypted through IBE according to the public parameters and the server identifier. Accordingly, the server obtains the plain text of the PreMasterSecret key encrypted through IBE according to the public parameters and the obtained private key.

Those skilled in the art know that it is necessary to obtain the public parameters for IBE in the case of using the IBE for authentication, and the public parameters are generally a package of data that includes a series of parameters, for example, security curve and algorithm set according to the requirements of the system. In practice, the corresponding identifier may be set for each package of public parameters, and the public parameters can be identified according to the identifier.

Further, the providing device capable of providing public parameters in this embodiment is further adapted to provide a private key for the server. The private key is designed to decrypt the PreMasterSecret key after the PreMasterSecret key encrypted through IBE is obtained, and obtain the plain text of the PreMasterSecret key.

In practice, the providing device in this embodiment may be an existing PKG device. The PKG device implements the function of providing public parameters, and the public parameters set in one PKG device are different from those in another PKG device. Accordingly, in the system configuration, multiple PKG devices need to be provided to support the provision of multiple packages of public parameters. Preferably, a separate public parameter server may be set to implement the function of providing at least one package of public parameters. At least one package of public parameters is set in the public parameter server in advance. An identifier may be set for each package of public parameters. This embodiment does not restrict the specific style of the providing device.

In conclusion, the technical solution described above combines the IBE technology with the SSL/TLS technology, enriches the modes of encrypting the PreMasterSecret key in the existing SSL/TLS protocol, and extends the use scope of the existing SSL/TLS protocol. Moreover, the SSL/TLS client negotiates public parameters with the server in any one of the multiple modes to uniquely determine the public parameters used in the encryption operation and decryption operation, and implement secure transmission of the PreMasterSecret key. Those skilled in the art know that the SSL/TLS negotiation and communication after the server obtains the PreMasterSecret key are the same as the negotiation and communication in the existing standard SSL/TLS. The various embodiments are also applicable to other technical solutions that use the IBE.

Part of the steps involved in the embodiments may be implemented through software. The software program may be stored in a readable storage medium such as hard disk and Compact Disk (CD).

Although various exemplary embodiments have been described, the scope of the claims is not limited to such embodiments. It is apparent that those skilled in the art can make modifications and variations may be made to the embodiments without departing from the scope of the claims. The claims are intended to cover such modifications and variations provided that they fall in the scope of protection or any equivalents.

What is claimed is:

1. A method for obtaining a key, comprising:
receiving, by a server, a Secure Socket layer (SSL)/Transport Layer Security (TLS) protocol client request message from a client, for confirming that the server supports Identity Based Encryption (IBE) authentication;
obtaining, by the server, public parameters and a private key for IBE;
receiving, by the server, another SSL/TLS protocol client message having a PreMasterSecret key encrypted via IBE; and
obtaining, by the server, a plain text of the PreMasterSecret key according to the public parameters and the private key, wherein when the client and the server pre-share at least one package of public parameters, the obtaining of the public parameters for the IBE comprises:
notifying, by the server, the client to use the pre-shared at least one public parameter;
receiving, by the server, a response from the client according to a notification of the server; and
obtaining, by the server, a package of public parameters for the IBE according to the response of the client, and
wherein if the client and the server pre-share multiple packages of public parameters, the notifying the client to use the pre-shared public parameters comprises:
notifying, by the server, an identifier associated with at least one package of public parameters of the multiple pre-shared packages of public parameters to the client;
accordingly, the response of the client is generated in the following way:
selecting, by the client, a package of public parameters among the multiple packages of public parameters, and responding to the server, with an identifier associated with the selected package of public parameters.

2. The method for obtaining a key according to claim 1, wherein the receiving a SSL/TLS protocol request message from a client, for confirming that the server supports IBE authentication comprises:
receiving, by the server, the SSL/TLS protocol client request message that carries a key package for the IBE authentication;
determining whether there is support for the IBE authentication; and
returning an SSL/TLS protocol acknowledgement message to a client indicating whether there is support for the IBE authentication.

3. The method for obtaining a key according to claim 1, wherein when the client and the server do not pre-share at least one package of public parameters, the obtaining of the public parameters for the IBE comprises:
sending, by the server, at least one package of public parameters to the client;
receiving, by the server, a notification from the client, and the notification carrying public parameters selected by the client among the at least one package of the public parameters sent by the server;
obtaining, by the server, a package of public parameters for the IBE according to the notification of the client.

4. The method for obtaining a key according to claim 1, wherein when the client and the server do not pre-share at least one package of public parameters, the obtaining of the public parameters for the IBE comprises:
sending, by the server, at least one Private Key Generator (PKG) identifier for obtaining the public parameters to the client;
receiving, by the server, a notification from the client, and the notification carrying a PKG identifier selected by the client among the received at least one PKG identifier, wherein the client obtains public parameters from a PKG corresponding to the selected PKG identifier;
obtaining, by the server, a package of public parameters for the IBE according to the notification of the client.

5. The method for obtaining a key according to claim 1, wherein when the client and the server do not pre-share at least one package of public parameters, the obtaining of the public parameters for the IBE comprises:
sending, by the server, at least one address identifier of public parameters stored in a public parameter server to the client;

receiving, by the server, a notification from the client, and the notification carrying an address identifier selected by the client among the received at least one address identifier, wherein the client obtains public parameters from a PKG corresponding to the selected address identifier;

obtaining, by the server, a package of public parameters for the IBE according to the notification of the client.

6. A client device comprising a hardware processor and a non-transitory storage medium, the client device configured to perform operations comprising:

send a Secure Socket layer (SSL)/Transport Layer Security (TLS) protocol client request message to a server, for confirming that the server supports IBE authentication;

obtain public parameters for IBE;

obtain a server identifier of the server after conform that the server supports IBE authentication; and generate and send another SSL/TTL protocol client message having a PreMasterSecret key encrypted through the IBE according to the obtained server identifier and the obtained public parameters;

store at least one package of public parameters pre-shared by the client and the server;

to select a package of public parameters as notified by the server; and respond to the server with an identifier associated with the selected public parameters after selecting the package of the public parameters from the at least one package of public parameters.

7. The client device of claim 6, further configured to:

send the SSL/TTL protocol client request message to the server, wherein the SSL/TTL protocol client request message carries a key package for the IBE authentication; and receive an SSL/TTL protocol IBE acknowledgement message returned by the server.

8. The client device of claim 6, further configured to:

obtain at least one package of public parameters sent by the server;

select a package of public parameters among the at least one package of public parameters; and notify the server of the selected public parameters after selecting the package of the public parameters among the at least one package of public parameters.

9. The client device of claim 6, further configured to:

configured to obtain at least one Private Key Generator (PKG) identifier sent by the server;

select a PKG identifier among the obtained PKG identifiers;

obtain public parameters from a PKG corresponding to the selected PKG identifier; and notify the server of the selected PKG identifier after selecting the PKG identifier.

10. A server in a comprising a hardware processor and a non-transitory storage medium, the server configured to perform operations comprising:

receive a Secure Socket layer (SSL)/Transport Layer Security (TLS) protocol client request message from a client, for confirming that the server supports Identity Based Encryption (IBE) authentication;

obtain public parameters for IBE;

obtain a private key for decrypting a PreMasterSecret key encrypted through the IBE, wherein the PreMasterSecret key is carried within another SSL/TTL protocol client message sent from the client;

receive the SSL/TTL protocol client message carrying the PreMasterSecret key encrypted through the IBE from the client;

decrypt the PreMasterSecret key encrypted through the IBE based on the private key and the public parameters;

obtain a plain text of the PreMasterSecret key;

store at least one package of public parameters pre-shared by the client and the server;

send a notification to the client with an identifier associated with the stored at least one package of public parameters;

receive a first public parameters selection, the first public parameters selection is selected by the client among the at least one package of public parameters pre-shared by the client and the server according to the notification of the server; and obtain public parameters that match the first public parameters selection.

11. The server of claim 10, further configured to:

receive the SSL/TTL protocol client request message sent by the client, wherein the SSL/TTL protocol client request message carries a key package for the IBE authentication; and return an SSL/TTL protocol acknowledgement message to the client after determining support of the IBE authentication.

12. The server of claim 10, further configured to:

send at least one package of public parameters to the client;

receive a second public parameters selection, the second public parameters selection is selected by the client among the at least one package of public parameters; and obtain a package of public parameters that matches the second public parameters selection.

13. The server of claim 10, further configured to:

send at least one Private Key Generator (PKG) identifier to the client;

wherein the receiving unit configured to receive a selected PKG identifier returned by the client; and obtain a package of public parameters for the IBE according to the received PKG identifier received by the receiving unit.

* * * * *